United States Patent
Hansen et al.

(10) Patent No.: US 10,040,378 B2
(45) Date of Patent: Aug. 7, 2018

(54) STOWABLE SEATS

(71) Applicant: Toyota Motor Engineering & Manufacturing North America, Inc., Erlanger, KY (US)

(72) Inventors: Charles S. Hansen, Northville, MI (US); Todd R. Muck, Fowlerville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 71 days.

(21) Appl. No.: 15/082,871

(22) Filed: Mar. 28, 2016

(65) Prior Publication Data

US 2017/0274800 A1   Sep. 28, 2017

(51) Int. Cl.
*B60N 2/30*     (2006.01)
*B60N 2/876*    (2018.01)

(52) U.S. Cl.
CPC .......... *B60N 2/3075* (2013.01); *B60N 2/309* (2013.01); *B60N 2/3011* (2013.01); *B60N 2/3065* (2013.01); *B60N 2/876* (2018.02)

(58) Field of Classification Search
CPC .... B60N 2/3075; B60N 2/3011; B60N 2/876; B60N 2/3065; B60N 2/309
USPC .......................... 296/66, 65.01, 65.09, 65.16
See application file for complete search history.

(56) References Cited

U.S. PATENT DOCUMENTS

| | | | |
|---|---|---|---|
| 3,025,106 A | 3/1962 | Evans et al. | |
| 6,742,841 B1 | 6/2004 | Soditch et al. | |
| 7,267,406 B2 * | 9/2007 | Sturt | B60N 2/3013 297/15 |
| 7,401,857 B2 | 7/2008 | Laux | |
| 7,568,764 B2 | 8/2009 | Harper et al. | |
| 8,251,450 B2 | 8/2012 | Carroll et al. | |
| 8,899,684 B2 | 12/2014 | Seibold | |
| 8,985,692 B2 | 3/2015 | Pacolt | |
| 8,998,331 B2 | 4/2015 | Hage-Hassan et al. | |
| 2010/0007167 A1 * | 1/2010 | Ito | B60N 2/22 296/66 |
| 2010/0295353 A1 | 11/2010 | Tame | |
| 2011/0204669 A1 * | 8/2011 | Onishi | B60N 2/24 296/65.01 |
| 2013/0341953 A1 * | 12/2013 | White | B60N 2/065 296/65.01 |
| 2015/0137549 A1 | 5/2015 | Markel | |

* cited by examiner

*Primary Examiner* — Joseph Pape
(74) *Attorney, Agent, or Firm* — Dinsmore & Shohl LLP

(57) ABSTRACT

A vehicle seat assembly is provided having a seat bottom and a seat back. The seat back pivotally connected to the seat bottom by a bracket where the bracket has a seat bottom portion and a seat back portion. The seat bottom portion is arranged at an angle θ with respect to the seat back portion so as to generally form a right angle. A main pivot axis extends through the seat bottom. The distal end of the seat bottom portion of the bracket is pivotally connected to the main pivot. The distal end of the seat back portion of the bracket is connected to the seat back so as to pivot the seat back with respect to the seat bottom. The seat back is configured to rotate on top of the seat bottom to a stowed position.

20 Claims, 6 Drawing Sheets

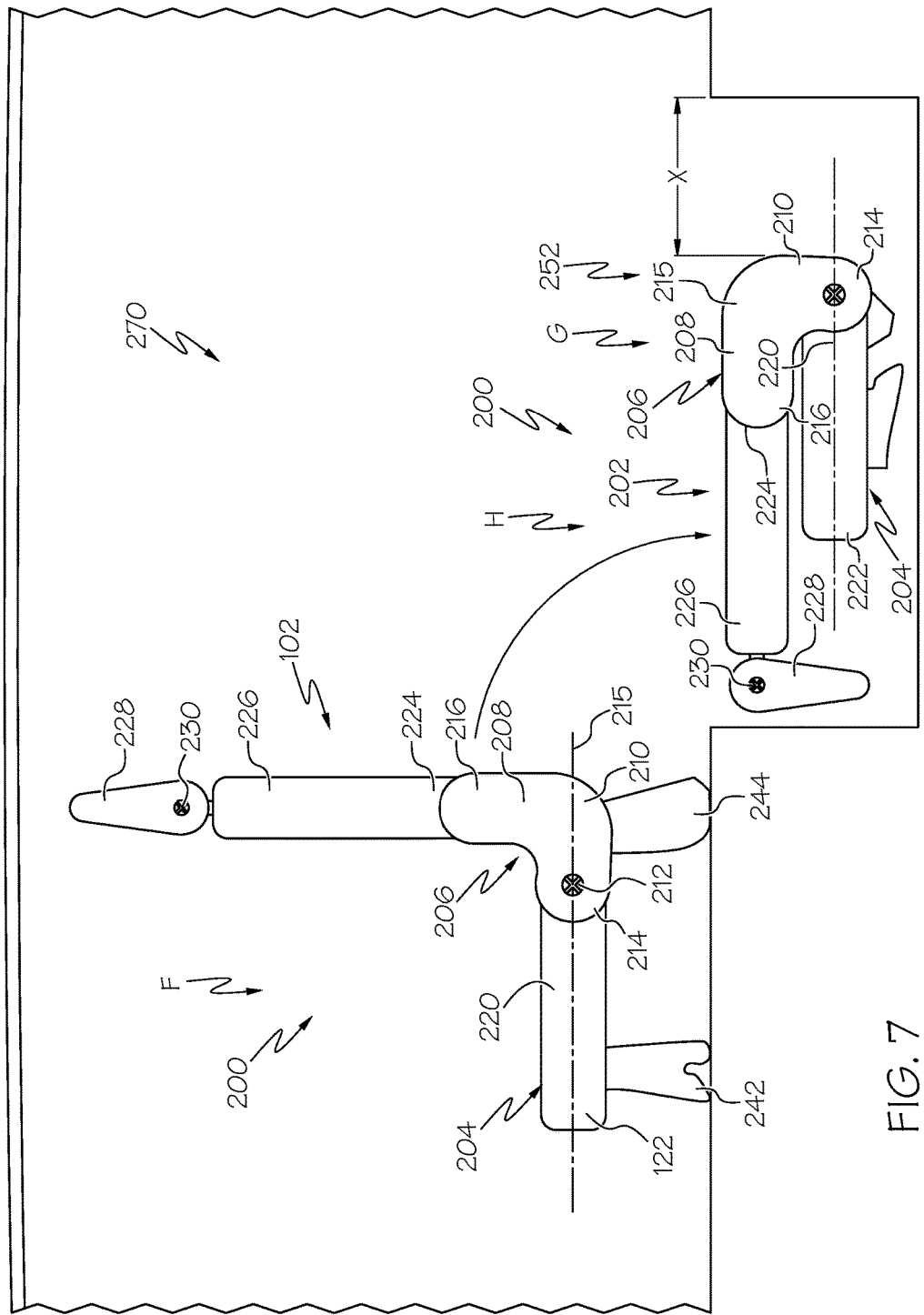

STOWABLE SEATS

TECHNICAL FIELD

The present specification generally relates to vehicle seat assemblies and, more specifically, a vehicle seat assembly having a bracket allowing for a more compact storage when the seat is stowed.

BACKGROUND

Vehicle seat assemblies which have reclining capability are known in the art. Current vehicle seats exist with a capability of stowing into a compartment within a vehicle. The vehicle seat commonly folds onto itself to a compact position to be stowed within a compartment. However, when the vehicle seat is folded onto itself, the seat is still large thus requiring a large compartment within the vehicle floor.

Furthermore, it is known to provide a seat assembly which folds up to more easily stow the vehicle seat. However, when the seat assemblies of the prior art are stowed, they take up a substantial amount of room within the storage areas of the vehicle.

Accordingly, a need exists for alternative vehicle seat assemblies providing for improved packaging and stowability.

SUMMARY

In one embodiment, a vehicle seat assembly includes a seat bottom and a seat back, the seat back pivotally connected to the seat bottom by a bracket, the bracket having a seat bottom portion and a seat back portion, the seat bottom portion arranged at an angle θ with respect to the seat back portion, the seat bottom portion providing a main pivot axis extending through the seat bottom and a distal end of the seat back portion of the bracket connected to the seat back so as to pivot the seat back with respect to the seat bottom along the main pivot axis, the seat back configured to rotate to a position on top of the seat bottom to a forward and stowed position.

In other embodiments, bracket for a vehicle seat is provided where the bracket is used to connect a seat bottom to a seat back, the seat bottom having a main pivot axis extending therethrough. The bracket may include a seat bottom portion and a seat back portion, the seat bottom the seat bottom portion arranged at an angle θ with respect to the seat back portion and a distal end of the seat bottom portion of the bracket pivotally connected to the main pivot axis, the distal end of the seat back portion of the bracket connected to the seat back so as to pivot the seat back with respect to the seat bottom, the seat back configured to rotate to a position on top of the seat bottom to a forward and stowed position.

In yet another embodiment, a vehicle is provided having a floor having a bucket and a seat having a seat bottom and a seat back, the seat back pivotally connected to the seat bottom by a bracket, the bracket having a seat bottom portion and a seat back portion, the seat bottom portion arranged at an angle θ with respect to the seat back portion, a main pivot axis extending through the seat bottom, the main pivot spaced apart from an edge of the seat bottom, a distal end of the seat bottom portion of the bracket pivotally connected to the main pivot axis, the distal end of the seat back portion of the bracket connected to the seat back so as to pivot the seat back with respect to the seat bottom, the seat back configured to rotate to a position on top of the seat bottom to a forward and stowed position wherein the seat is configured to move from a use position to a stowed position, the stowed position where the seat back is rotated over and onto the seat bottom, the stowed position further defined when the seat is positioned within the bucket.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 illustrates the seat assembly in both a use and stowed position according to one or more embodiments shown and described herein.

DETAILED DESCRIPTION

Figure 1:
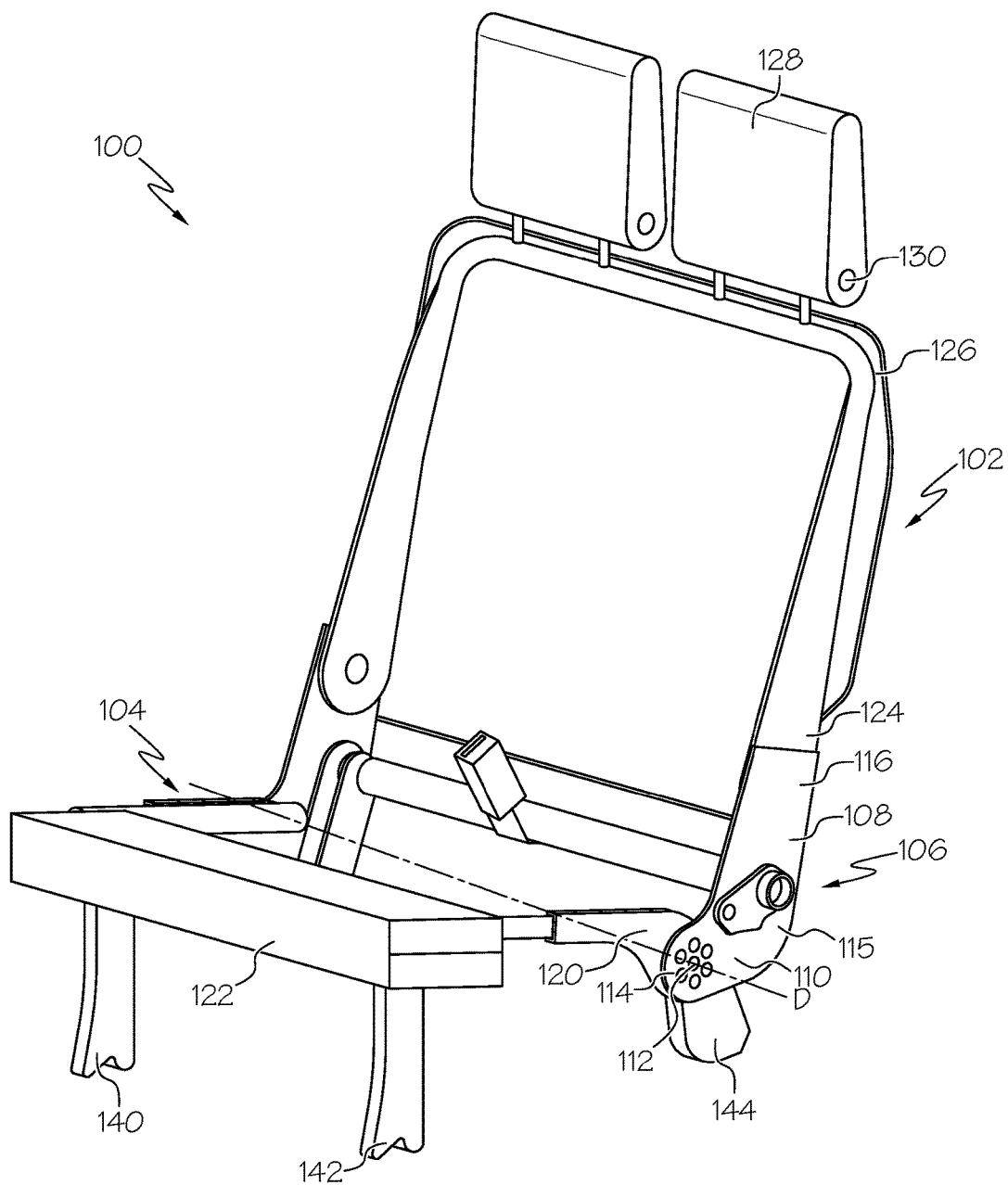
FIG. 1 depicts a perspective view of the seat assembly having an offset bracket according to one or more embodiments shown and described herein.

FIG. 1 generally depicts one embodiment of a seat assembly having an offset bracket where the bracket provides for a more compact stowage of the seat assembly. The seat assembly includes a seat back and a seat bottom. The seat back is pivotally connected to the seat bottom by the offset bracket. The bracket is "offset" in that the bracket is mounted to the seat bottom at an axis extending horizontally through the seat bottom where the axis is slightly spaced apart from an outer edge of the seat bottom. The seat assembly is then configured to move from a use position to a stowed position where the seat back pivots about the main pivot axis to a stowed position wherein the seat back rotates onto and extends forward of the seat bottom so as to package in a tighter configuration.

The seat assembly is connected to a floor adjacent to a bucket (i.e. a compartment). The bucket may receive the seat assembly with the seat assembly in the stowed position. Various embodiments of the seat assembly and operation of the seat assembly will be described in more detail herein.

FIG. 1 depicts a first embodiment of a seat assembly 100 having a seat back 102 and a seat bottom 104. The seat back 102 is pivotally connected to the seat bottom 104 by a bracket 106. The bracket 106 includes a seat bottom portion 110 and a seat back portion 108. The seat bottom portion 110 extends in a generally vehicle longitudinal direction and the seat back portion 108 extends in a generally vehicle vertical direction, at an angle θ to the seat bottom portion 110. In some embodiments, the angle θ between the seat bottom portion 110 and the seat back portion 108 may be at least about 90 degrees, such as between 90 and 135 degrees forming a somewhat L-shape.

Figure 2:
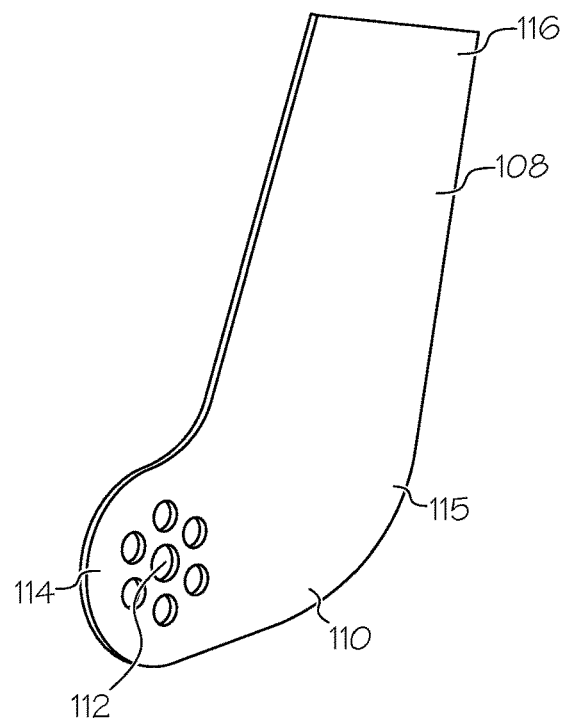
FIG. 2 depicts a perspective view of the offset bracket of FIG. 1 according to one or more embodiments shown and described herein.
Figure 3:
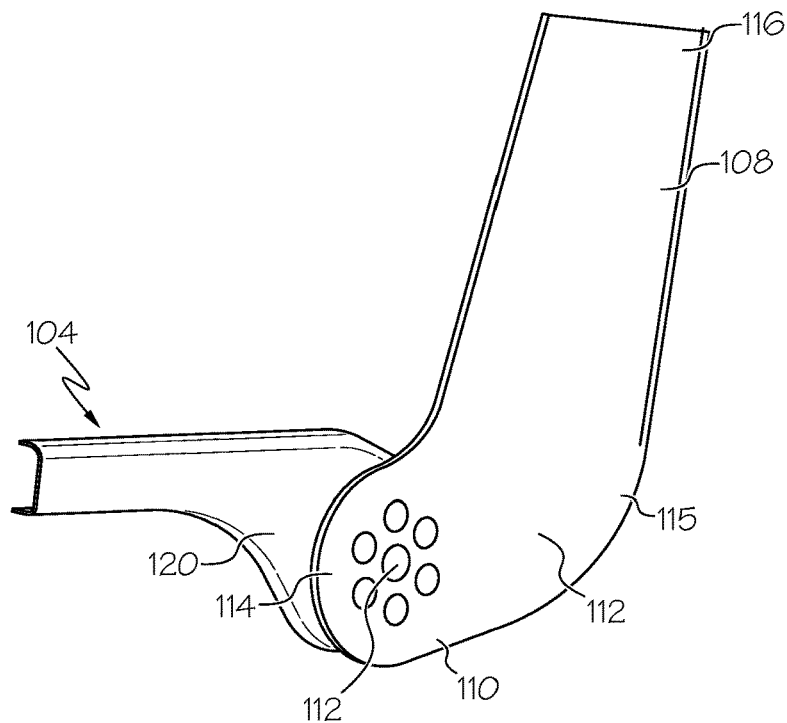
FIG. 3 depicts a perspective view of the bottom portion of the seat assembly connected to the bracket according to one or more embodiments shown and described herein.

Referring also to FIGS. 2 and 3, the seat bottom portion 110 includes a distal end 114 having a main pivot axis 112. The seat back portion 108 includes a distal end 116 configured to connect to the seat back 102. The bracket 106 includes a bend 115 to form the L-shaped configuration. While the present embodiment includes a bracket 106, similar configurations and bends may also be provided to achieve the same result including varying angles and degrees between the seat bottom portion and the seat back portion.

As described above, the bracket 106 has two distal ends 114, 116 spaced apart from the bend 115. In the some embodiments, the distal ends 114, 116 are rounded but may alternatively be squared off or any other suitable shape. In the present embodiment, the bend 115 includes an outer edge which is also curved or rounded to proceed an aesthetically appealing appearance. Alternatively, the bend 115 may be square or any other suitable shape.

The distal end 116 of the seat back portion 108 of the bracket 106 connects directly to the seat back 102. The seat back 102 includes a proximal end 124 and a distal end 126. The distal end 116 of the seat back portion 108 of the bracket 106 connects directly to the proximal end 124 of the seat back 102. The distal end 126 of the seat back 102 may further include a head rest 128 having a pivot axis 130. In some embodiments, the head rest 128 is pivotable about the pivot axis 130 to provide for a more compact packaging during a stowed position.

The seat bottom 104 includes a proximal end 120 and a distal end 122. The distal end 114 of the seat bottom portion 110 of the bracket 106 connects to the proximal end 120 of the seat bottom 104. The main pivot axis 112 extends generally horizontally through the seat bottom 104, such as illustrated by reference D of FIG. 1.

The main pivot axis 112 is located forward of the seat back portion 104. In particular, the main pivot axis 112 is offset forward or toward the distal end 122 of the seat bottom 104 away from a geometric center of the seat back portion 108 of the bracket 106. The amount of offset of the pivot axis 112 from the seat back portion 108 (and the seat back 102) can correspond to space savings when the seat assembly 100 is placed ion the stowed position, as will be described below. The seat back 102 and the seat bottom 104 are unhinged at their interface which allows for forward movement of the seat back 102 relative to the seat bottom 104.

Figure 4:
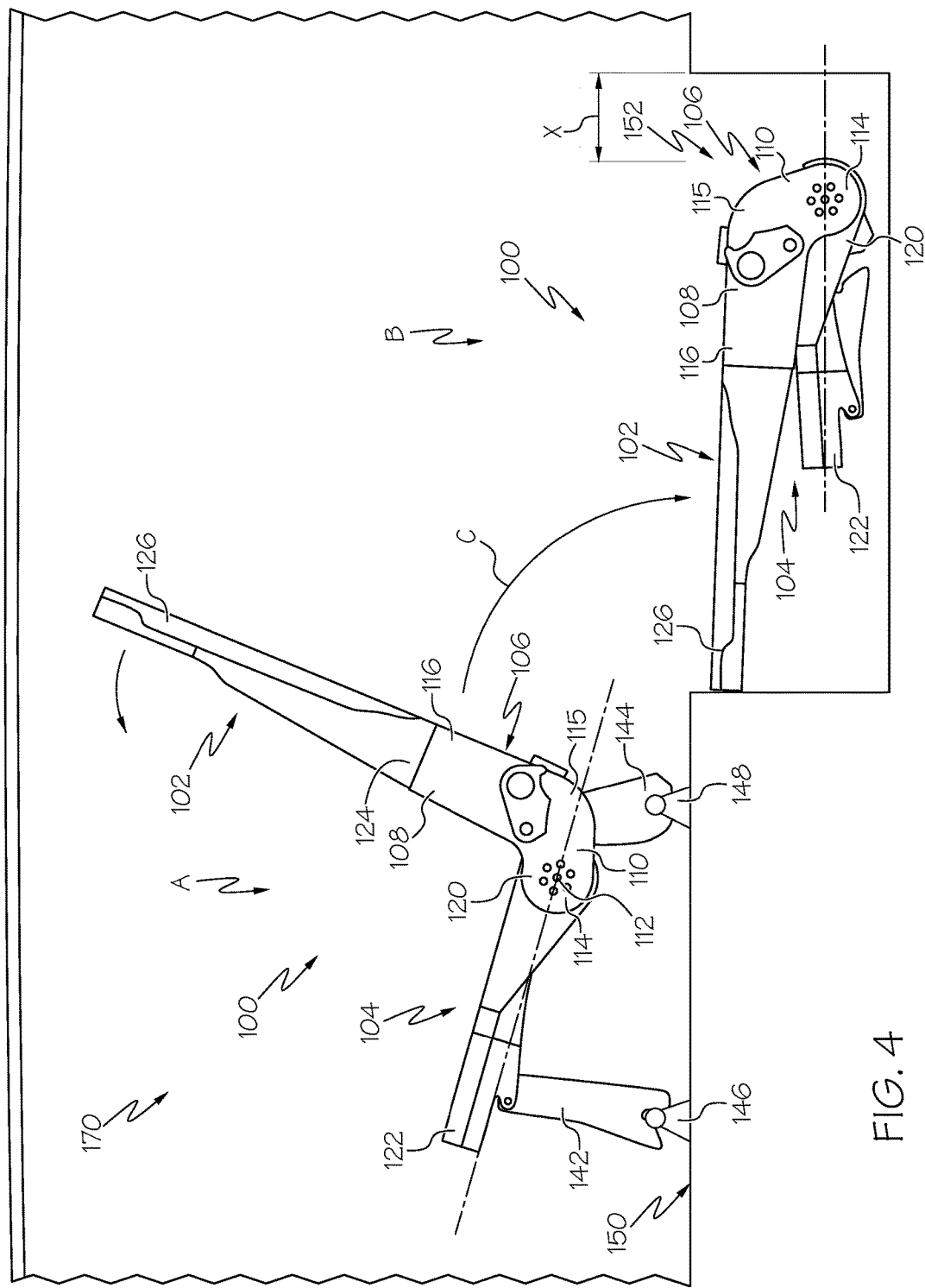
FIG. 4 depicts a side view of the seat assembly in both a use position and a stowed position according to one or more embodiments shown and described herein.

Referring to FIG. 4, the seat bottom 104 further includes legs 140, 142, 144 and connection portions 146, 148 so as to connect the seat assembly 100 to a vehicle floor 150. The connection portions 146, 148 connect to the vehicle floor 150. The vehicle floor 150 further includes the bin or bucket 152 configured to hold the seat assembly 100 when in a stowed position.

FIG. 4 illustrates the seat assembly 100 within a vehicle 170. The seat assembly 100 is shown in the use position A and in the stowed position B. The seat assembly 100 moves from a use position A to the stowed position B as illustrated by directional arrow C. The seat assembly 100 may move from the use position A to the stowed position B by a manual movement or an automated movement actuated by the press of a button of the user.

During movement from the use position A to the stowed position B, the seat back 102 rotates forward and over and onto the seat bottom 104. Inclusion of the bracket 106 allows the seat back to be displaced to a more forward position, thereby saving room within the bucket 152.

As illustrated in FIG. 4, by using the bracket 106, a linear distance X is saved within the bucket 152. In the present embodiment, the linear distance X ranges between 1 to 14 inches depending on the size and dimensions of the seat assembly 100 and the bucket 152. The bracket 106 permits a more significant forward rotation of the seat back 102 due to the offset position of the main pivot axis 112 forward of the outer edge of the seat bottom 104, thereby reducing the rearward footprint of the seat assembly 100 in the stowed position B a linear distance X.

By reducing the rearward footprint of the seat assembly 100 within the bucket 152 using the offset nature of the bracket 106, additional storage space is acquired and available for use within the vehicle behind the seat assembly 100 in stowed position B. The reduced packaging requirements by using the bracket 106 allow for a smaller bucket, or for storage of other items within the bucket. A more compact seat assembly 100 and smaller packaging space of the seat assembly 100 may also provide for reduced packaging of the seat assembly 100 if it is removed from the vehicle for storage.

This movement of the seat assembly between the use and stowed positions can be actuated either manually by the user or by a mechanically driven actuator or motor. In a preferred embodiment, the user simply presses a button (e.g. or a key fob, lever, dashboard . . . etc.) or other user impact and the seat assembly as a whole moves from the use position A to the stowed position B. When a user uses the seat assembly 100, the user actuates movement of the entire seat by means of a user input or a manual movement of the seat assembly 100. If the movement is manual, the seat back 102 will rotate towards the seat bottom 104 to a folded and stowed position. In some embodiments, the movement is automatic. The seat back 102 is moved either before actuation of the folding of the seat assembly 100 or while actuation of the folding of the seat assembly 100 is occurring (i.e. the movement as illustrated in FIG. 4).

In some embodiments, the head rest is pivotally connected to the seat back 102. If the head rest is moved to a stowed position where the head rest is generally perpendicular to the seat back 102, even more packaging space is saved forward of the seat assembly 100 within the bucket 152.

Figure 5:
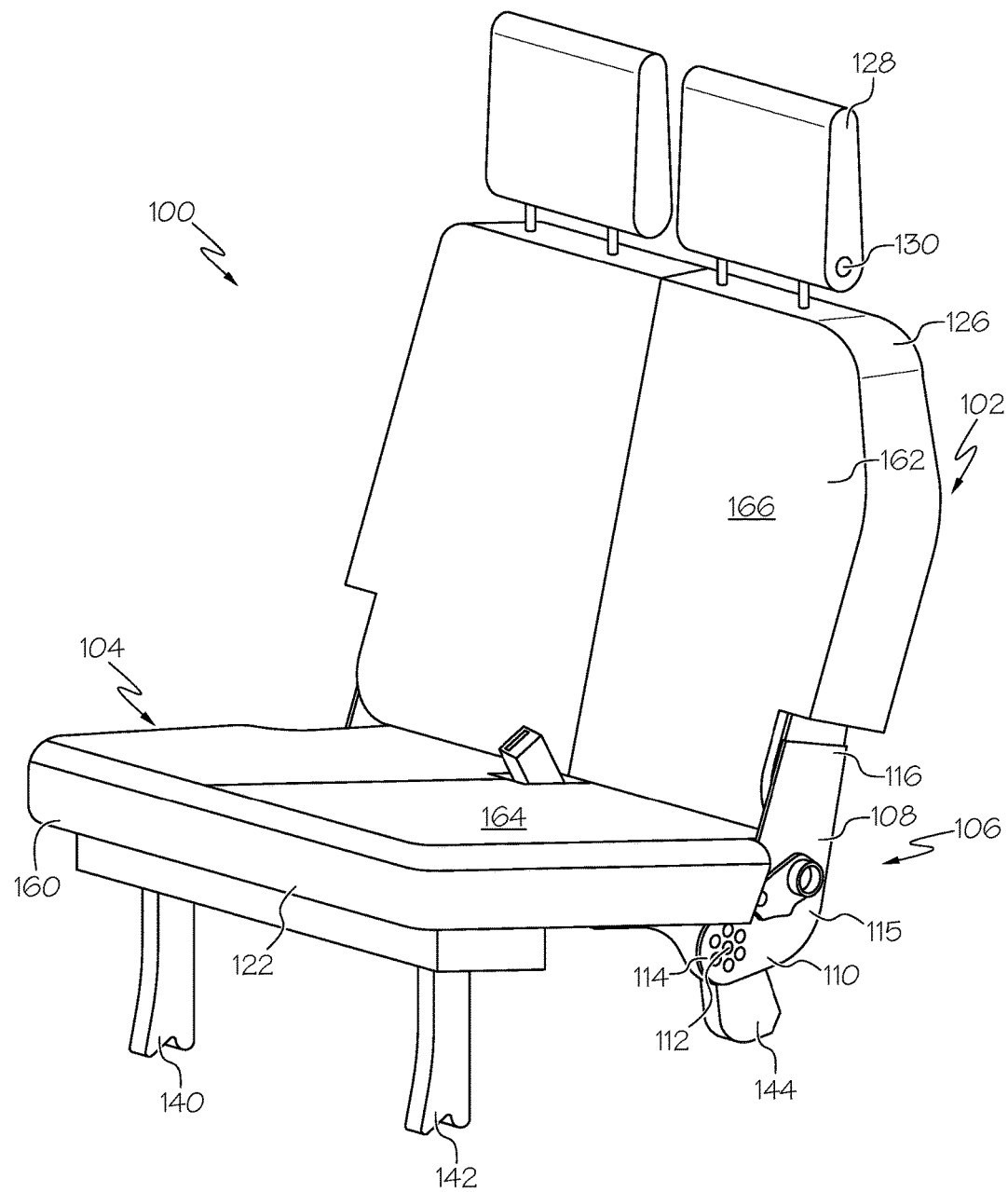
FIG. 5 depicts a perspective view of the seat assembly having the cushions and trim installed thereon with the bracket according to one or more embodiments shown and described herein.

FIG. 5 illustrates the seat assembly 100, such as illustrated in FIGS. 1 and 4, having cushions and trim over the frame. The seat back 102 includes seat cushion 162 and a trim portion 166. The trim portion 166 may be a vinyl, leather, and/or cloth material to cover the seat cushion 162. Similarly, the seat bottom 104 includes a seat cushion 160 having a trim cover 164 disposed around the cushion 160. Similarly, the trim cover 164 may be made of a leather, vinyl, and/or cloth material.

The frame portions of the seat back 102 and the seat bottom 104 and the bracket 106 may be made of a metal, plastic, plastic like, polymer, and/or polymer like material sufficient to withstand the rigors required for the seat assembly 100. The legs 140, 142, 144 and the connection portions 146, 148 are similarly made of a metal, preferably a lightweight metal, or a polymer, polymer like, plastic, and/or plastic like material. Other components described herein may be made of similar materials or materials having similar properties.

Figure 6:
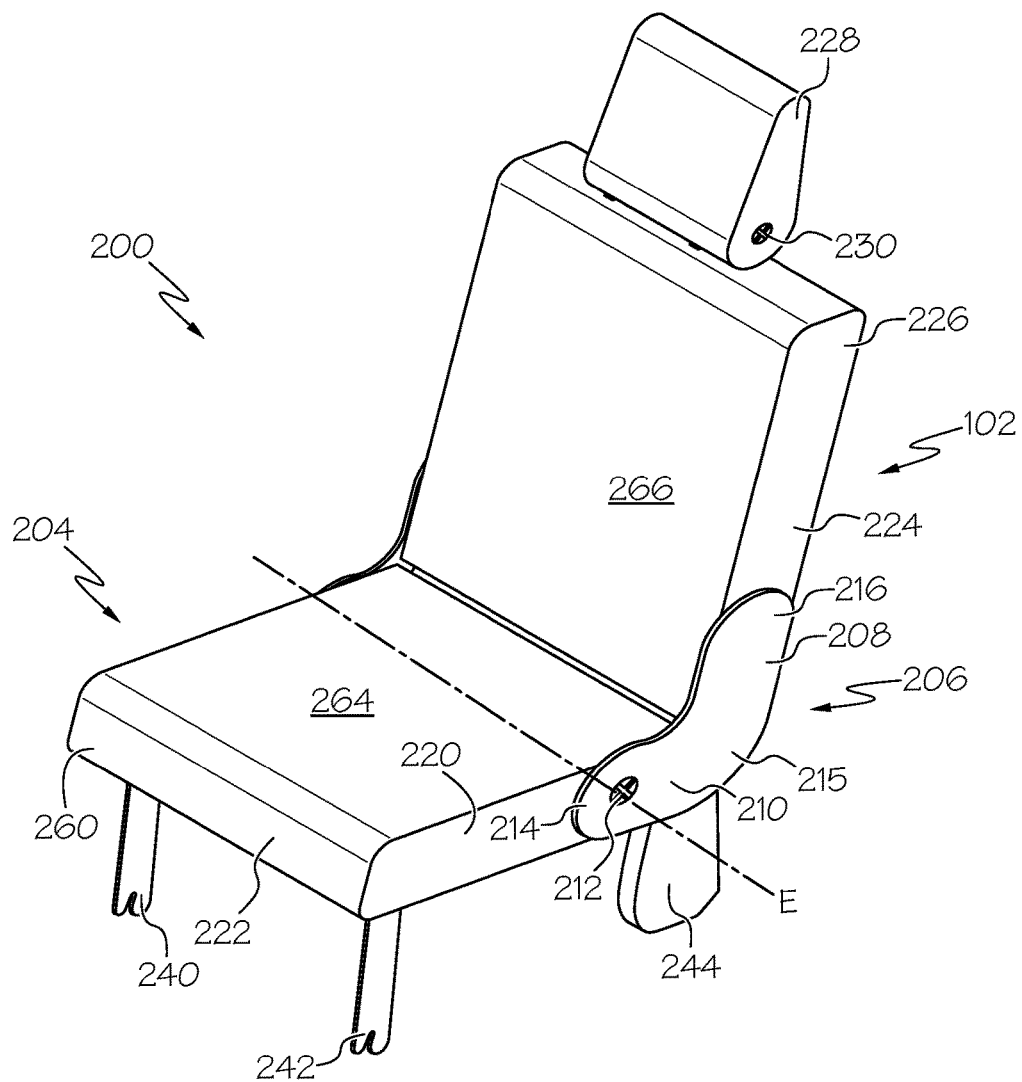
FIG. 6 illustrates an alternative embodiment of the seat assembly having the offset bracket according to one or more embodiments shown and described herein.

FIGS. 6 and 7 depict an alternative embodiment of a seat assembly 200 having a pivotable headrest 228. The seat assembly 200 includes a seat back 202 and a seat bottom 204. The seat back 202 is pivotally connected to the seat bottom 204 by means of a bracket 206. The seat bottom portion 210 extends in a generally vehicle longitudinal direction and the seat back portion 208 extends in a generally vehicle vertical direction, at an angle θ to the seat bottom portion 210. In some embodiments, the angle θ between the seat bottom portion 210 and the seat back portion 208 may be at least about 90 degrees, such as between 90 and 135 degrees forming a somewhat L-shape.

The seat bottom portion 210 includes a distal end 214 having the main pivot axis 212. The seat back portion 208 includes a distal end 216 configured to connect to the seat back 202. The generally L-shaped bracket 206 includes a bend 215 to form the L-shaped configuration. While the present embodiment includes a generally L-shaped bracket 206, similar configurations and bends may also be provided to achieve the same result including varying angles and degrees between the seat bottom portion and the seat back portion.

As described above, the bracket 206 is generally L shaped have two distal ends 214, 216 spaced apart from a bend 215. In the some embodiments, the distal ends 214, 216 are rounded but may alternatively be squared off or any other suitable shape. In the present embodiment, the bend 215 includes an outer edge which is also curved or rounded to proceed an aesthetically appealing appearance. Alternatively, the bend 215 may be square or other suitable shape.

The distal end 216 of the seat back portion 208 of the bracket 206 connects directly to the seat back 202. The seat back 202 includes a proximal end 224 and a distal end 226. The distal end of the seat back portion of the bracket 206 connects directly to the proximal end 224 of the seat back 202. The distal end 226 of the seat back 202 may further include a head rest 228 having a pivot axis 230. In some embodiments, the head rest 228 is pivotable about the pivot axis 230 to provide for a more compact packaging during a stowed position.

The seat bottom 204 includes a proximal end 220 and a distal end 222. The distal end 214 of the seat bottom portion 210 of the bracket 206 connects to the proximal end 220 of the seat bottom 204. The main pivot axis 212 extends generally horizontally through the seat bottom 204, such as illustrated by reference E of FIG. 6.

The seat bottom 204 further includes legs 240, 242, 244 and connection portions 246, 248 so as to connect the seat assembly 200 to a vehicle floor 250. The connection portions 246, 248 connect to the vehicle floor 250. The vehicle floor 250 further includes the bin or bucket 252 configured to hold the seat assembly 200 when in a stowed position.

The seat bottom portion 210 extends in a generally vehicle longitudinal direction and the seat back portion 108 extends in a generally vehicle vertical direction, at an angle θ to the seat bottom portion 210. In some embodiments, the angle θ between the seat bottom portion 210 and the seat back portion 208 may be at least about 90 degrees, such as between 90 and 135 degrees forming a somewhat L-shape.

FIG. 6 depicts the seat assembly 200 having cushions and trim over the frame. The seat back 202 includes seat cushion 262 and a trim portion 266. The trim portion 266 may be a vinyl, leather, and/or cloth material to cover the seat cushion 262. Similarly, the seat bottom 204 includes a seat cushion 260 having a trim cover 264 disposed around the cushion 260. Similarly, the trim cover 264 may be made of a leather, vinyl, and/or cloth material.

The frame portions of the seat back 202 and the seat bottom 204 and the bracket 206 may be made of a metal, plastic, plastic like, polymer, and/or polymer like material sufficient to withstand the rigors required for the seat assembly 200. The legs 240, 242, 244 and the connection portions 246, 248 are similarly made of a metal, preferably a lightweight metal, or a polymer, polymer like, plastic, and/or plastic like material. Other components described herein may be made of similar materials or materials having similar properties.

FIG. 7 illustrates the seat assembly 200 within a vehicle 270. The seat assembly 200 is shown in a use position F and in a stowed position G. The seat assembly 200 moves from a use position F to the stowed position G as illustrated by directional arrow H. The seat assembly 200 may move from the use position F to the stowed position G by a manual movement or an automated movement actuated by the press of a button of the user.

During movement from the use position A to the stowed position G, the seat back 202 rotates forward and over and onto the seat bottom 204. Inclusion of the bracket 206 allows the seat back to be displaced to a more forward position, thereby saving room within the bucket 252.

As illustrated in FIG. 7, by using the bracket 206, a linear distance X is saved within the bucket 252. In the present embodiment, the linear distance X ranges between 1 to 14 inches depending on the size and dimensions of the vehicle seat assembly 200 and the bucket 252. The bracket 206 permits a more significant forward rotation of the seat back 202 thereby reducing the rearward footprint of the seat assembly 200 in the stowed position a linear distance X.

By reducing the rearward footprint of the seat assembly 200 within the bucket 252 using the offset nature of the bracket 206, additional storage space is acquired and available for use within the vehicle behind the seat assembly 100 in stowed position. The reduced packaging requirements by using the bracket 206 allow for a smaller bucket, or for storage of other items within the bucket. A more compact seat assembly 100 and smaller packaging space of the seat assembly 200 may also provide for reduced packaging of the seat assembly 200 if it is removed from the vehicle for storage.

This movement of the seat assembly is actuated either manually by the user or by a mechanically driven actuator or motor. In a preferred embodiment, the user simply presses a button (e.g. or a key fob, lever, dashboard . . . etc.) or other user impact and the seat assembly as a whole moves from the use position F to the stowed position G. When a user uses the seat assembly 200, the user actuates movement of the entire seat by means of a button or a manual movement. If the movement is manual, the seat back 202 will rotate towards the seat bottom 204 to a folded and stowed position. In some embodiments, the movement is automatic. The seat back 202 is moved either before actuation of the folding of the seat assembly 200 or while actuation of the folding of the seat assembly 200 is occurring (i.e. the movement as illustrated in FIG. 7).

By reducing the footprint of the seat assembly 200 within the bucket 252, additional storage space is acquired and available for use within the vehicle. The reduced packaging requirements by using the bracket 206 allow for a smaller bucket, or for storage of other items within the bucket. A more compact seat assembly 200 and smaller packaging space of the seat assembly 200 may provide for reduced packaging of the seat assembly 200 if it is removed from the vehicle for storage.

This movement is actuated either manually by the user or by a mechanically driven actuator or motor. In a preferred embodiment, the user simply presses a button and the seat assembly as a whole moves from the use position F to the stowed position G.

In some embodiments, the head rest 228 is pivotally connected to the seat back 202. If the head rest 228 is moved to a stowed position where the head rest is generally perpendicular to the seat back 202, even more packaging space is saved within the bucket 252.

Movement of the head rest 228 may be manual or automatic, similar to the movement of the seat back as described above. This movement is actuated either manually by the user or by a mechanically driven actuator or motor. In a preferred embodiment, the user simply presses a button and the seat assembly as a whole moves from the use position F to the stowed position G including movement of the head rest 228 to the stowed position, such as depicted in FIG. 7.

In all of the embodiments described above, it should be appreciated that a second bracket may be provided on an opposite side of the seat assembly 100 or 200. This bracket includes the same main pivot axis as the first brackets 106, 206 and may be used in the same manner as enumerated above.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle seat assembly comprising:
a seat bottom that includes a seat cushion connected to the seat bottom; and
a seat back, the seat back pivotally connected to the seat bottom by a bracket, the bracket having a seat bottom portion and a seat back portion, the seat bottom portion arranged at an angle $\theta$ with respect to the seat back portion, the seat bottom portion providing a main pivot axis extending through the seat bottom; and
a distal end of the seat back portion of the bracket connected to the seat back so as to pivot the seat back with respect to the seat bottom along the main pivot axis, the seat back configured to rotate to a position on top of the seat bottom to a forward and stowed position,
wherein the seat cushion is secured to the seat bottom such that a position of the seat cushion with respect to the seat bottom is maintained as the seat back rotates between the position on top of the seat bottom and the forward and stowed position.

2. The vehicle seat assembly of claim 1 wherein the bracket is generally L-shaped.

3. The vehicle seat assembly of claim 1 further comprising a head rest pivotable from a generally use position to a stowed position where the use position is defined when the head rest is parallel with the seat back, the stowed position defined where the head rest is generally perpendicular to the seat back.

4. The vehicle seat assembly of claim 3 wherein the head rest is moved to the stowed position so as to save space.

5. The vehicle seat assembly of claim 1 wherein the vehicle seat assembly is connected to a vehicle floor, the vehicle floor having a bucket, the vehicle seat assembly is stowable within the bucket after the seat back has rotated towards the seat bottom to the forward and stowed position.

6. The vehicle seat assembly of claim 1 wherein the seat back portion of the bracket is fixedly connected to the seat back.

7. The vehicle seat assembly of claim 1 wherein the bracket is provided on one side of the vehicle seat assembly and a second bracket is provided on an opposite side of the vehicle seat assembly.

8. A bracket for a vehicle seat, the bracket used to connect a seat bottom to a seat back, the seat bottom includes a seat cushion connected to the seat bottom, the seat bottom having a main pivot axis extending therethrough, the bracket comprising:
a seat bottom portion and a seat back portion, the seat bottom portion arranged at an angle $\theta$ with respect to the seat back portion; and
a distal end of the seat bottom portion of the bracket pivotally connected to the main pivot axis, the distal end of the seat back portion of the bracket connected to the seat back so as to pivot the seat back with respect to the seat bottom, the seat back configured to rotate to a position on top of the seat bottom to a forward and stowed position,
wherein the seat cushion is secured to the seat bottom such that a position of the seat cushion with respect to the seat bottom is maintained as the seat back rotates between the position on top of the seat bottom and the forward and stowed position.

9. The bracket of claim 8 wherein the bracket is generally L-shaped.

10. The bracket of claim 8 wherein the bracket connects directly to both the seat bottom and the seat back, the seat back includes a seat back cushion and a seat back trim portion covering the seat back, the seat bottom includes a seat bottom trim portion covering the seat bottom.

11. The bracket of claim 8 wherein the vehicle seat is connected to a vehicle floor, the vehicle floor having a bucket, the vehicle seat is stowable within the bucket after the seat back has rotated towards the seat cushion to the forward and stowed position.

12. The bracket of claim 8 wherein the seat back portion of the bracket is fixedly connected to the seat back.

13. A vehicle comprising:
a vehicle floor having a bucket; and
a seat having a seat bottom and a seat back, the seat bottom includes a seat cushion connected to the seat bottom, and the seat back pivotally connected to the seat bottom by a bracket, the bracket having a seat bottom portion and a seat back portion, the seat bottom portion arranged at an angle $\theta$ with respect to the seat back portion, a main pivot axis extending through the seat bottom, the main pivot axis spaced apart from an edge of the seat bottom, a distal end of the seat bottom portion of the bracket pivotally connected to the main pivot axis, the distal end of the seat back portion of the bracket connected to the seat back so as to pivot the seat back with respect to the seat bottom, the seat back configured to rotate to a use position on top of the seat bottom to a forward and stowed position;

wherein the seat is configured to move from the use position to the forward and stowed position, the forward and stowed position where the seat back is rotated over and onto the seat bottom, the forward and stowed position further defined when the seat is positioned within the bucket.

14. The vehicle of claim 13 wherein the seat further includes a head rest pivotable from a generally use position to a stowed position where the use position is defined when the head rest is parallel with the seat back, the stowed position defined where the head rest is generally perpendicular to the seat back.

15. The vehicle of claim 14 wherein the head rest is moved to the stowed position so as to save space.

16. The vehicle of claim 13 wherein the seat is connected to the vehicle floor, the seat is stowable within the bucket after the seat back has rotated towards the seat bottom to the forward and stowed position.

17. The vehicle of claim 13 wherein the seat back portion of the bracket is fixedly connected to the seat back.

18. The vehicle of claim 13 wherein the bracket is provided on one side of the seat and a second bracket is provided on an opposite side of the seat.

19. The vehicle of claim 13 wherein
the bracket connects directly to both the seat bottom and the seat back, the seat back includes a seat back cushion and a seat back trim portion covering the seat back, and the seat bottom includes a seat bottom trim portion covering the seat bottom.

20. The vehicle of claim 13 wherein the seat is removable from the vehicle floor so as to be stowable within the bucket of the vehicle floor.

* * * * *